Aug. 21, 1956          J. J. VILLNAVE          2,759,381
                    LID REMOVER AND RETAINER
                      Filed Sept. 3, 1953

INVENTOR
JAMES J. VILLNAVE
BY
ATTORNEY

United States Patent Office 2,759,381
Patented Aug. 21, 1956

2,759,381

LID REMOVER AND RETAINER

James J. Villnave, Kansas City, Mo.

Application September 3, 1953, Serial No. 378,228

1 Claim. (Cl. 81—3.1)

This invention relates to a lid remover and more particularly to a device for removing the lids of cans, bottles, jars and similar articles.

A primary object of the invention is the provision of such a device adapted for the removal of the lid from a jar or similar article with a minimum of effort, time and difficulty.

Another object of the device is the provision of means whereby removal of a variety of sizes of lids may be readily effected.

Still another object of the invention is the provision of a device which will effectively and securely grasp the lid of a receptacle, reducing the possibility of slippage to a minimum.

A further object of the device is the provision of an improved article whereby the lid of a container may be removed with a single, simple relatively effortless motion.

Still further objects will in part be obvious and in part be pointed out as the description of the invention proceeds and shown in the accompanying drawing wherein there is disclosed a preferred embodiment of this inventive concept.

In the drawings.

Similar reference characters refer to similar parts throughout the several views.

Figure 1:
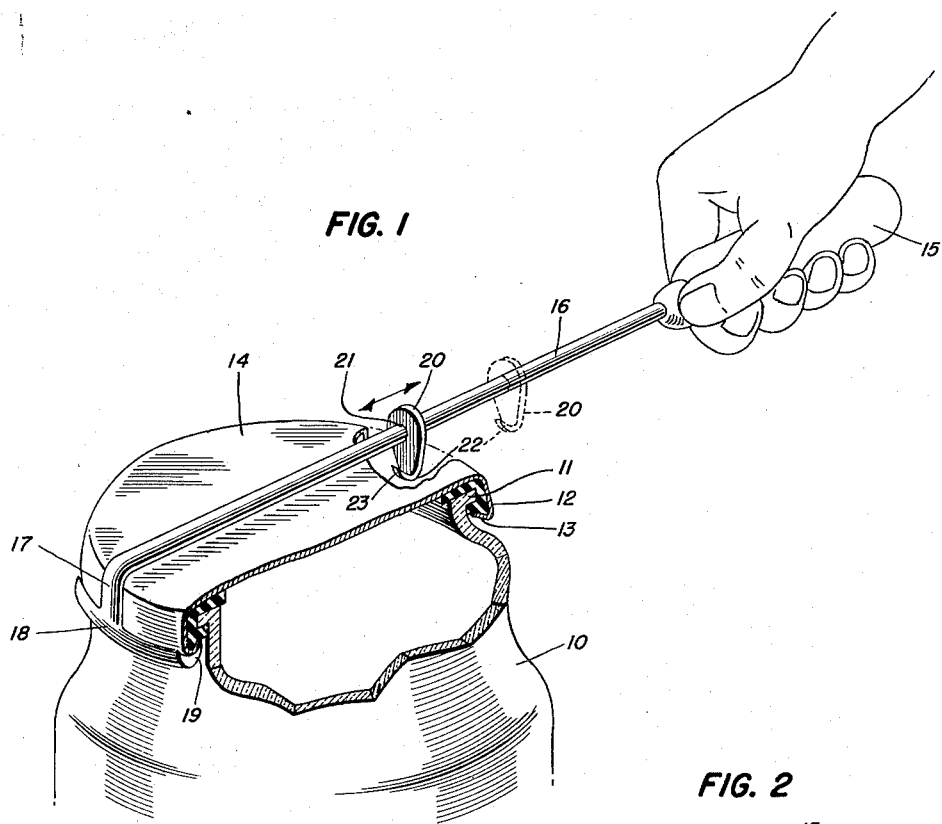
Fig. 1 is a perspective view partially in section and partially in elevation showing the device of the instant invention as applied to the lid of a jar to be removed.

Referring now to the drawing in detail, there is generally indicated at 10 a jar or container provided with a peripheral lip 11 upon which is adapted to be positioned a rubber sealing gasket 12 held in position by the inwardly reverted rim 13 of a closure cap 14.

The device of the instant invention comprises a handle 15 of any desired material from which extends an elongated shank 16. The shank 16 terminates in a right-angularly disposed flattened depending extremity 17 which has at its lower end a transversely-disposed arcuate cross-head 18. The cross-head 18 has an inwardly reverted lip or flange 19 which terminates in a relatively sharp edge which is adapted, as best shown in Figs. 1 and 2, to engage beneath the rim or lip 13 of lid 14.

Slidably mounted on shank 16 is a movable member 20 provided with a centrally positioned bore 21 and terminating at its lower extremity in an upwardly turned hook-shaped portion 22 having a relatively sharp pointed edge 23 adapted to be engaged under the rim 13 at a point diametrically-opposed to the point of engagement of flange 19.

Figure 2:
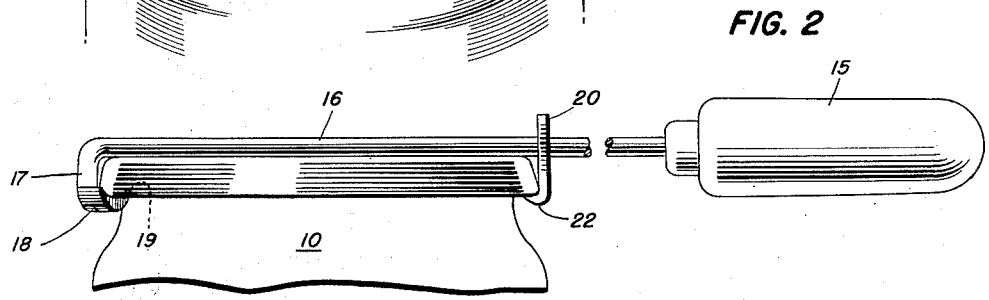
Fig. 2 is a side elevational view of the device, partially broken away, applied to a jar lid.
Figure 3:
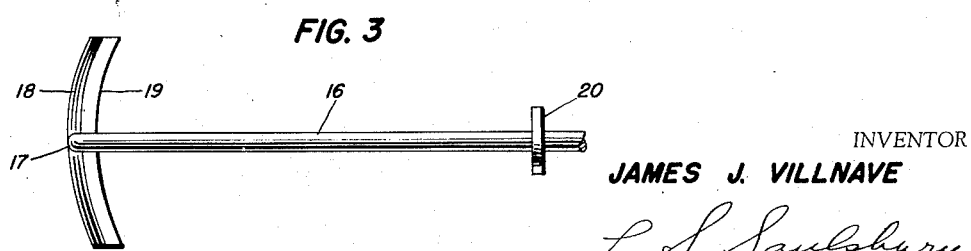
Fig. 3 is a fragmentary top plan view.

In the use and operation of the device as previously stated, handle 15 is grasped in the hand as shown in Fig. 1, the reverted edge 19 is engaged under the rim 13 of the lid 14 and the member 20 slid along the shank 16 until the point 23 of hook 22 engages under the rim on the opposite side of lid 14.

A quick lifting action on the handle 15 will thus readily disengage the rim 13 from flange 11 and the jar will thus be promptly and efficiently opened.

Obviously the sliding arrangement of member 20 permits the application of the device to a wide range of sizes of container lids.

It will be apparent that the device upon being placed over the lid of the container will have tight and non-fulcrum engagement with the lid and in effect provides a rigid handle thereon. The cross-head 18 has its inverted face so curved as to have substantially flush engagement with the under edge of the lid and its sharp edge 19 permits the full area of this face to have such engagement. The reverted face will accordingly rigidly hold the lid against a displacement in a direction along the shank and from the cross-head 18 when the lid has been removed from the container and by virtue of the arcuate shape of the cross-head 18 the lid is held against displacement in a direction normal to the shank. The lid will be further restrained against rotation in the device by virtue of the sharp hook connection of the hook 22 and its point 23 with the under edge of the lid at the opposite side thereof. Some indentation may have been made with the underside of the lid due to the lifting pressure of the device with the hook 22 and by the point 23 so that rotation will be prevented. Also with some slight play of the device upon the lid there will be a tendency for the ends of the sharp edge 19 of the cross-head to indent the under edge of the lid. It will be further apparent that the lid will so be held by the device that the lid can be returned to the container with the device. It will thus be seen that control of the lid is had at all times and when the same has been removed from the container it will not be lost upon the floor so as to clutter the kitchen or places where these lids are being removed from containers. With little force and slight bending of the portions of the lid the lid can be removed from the device.

From the foregoing, it will now be seen that there is herein provided an improved lid remover which accomplishes all of the objects of this invention and many others including advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

What is claimed is:

In a device for removing a lid from a container, a handle, an elongated shank extending therefrom, an angularly disposed extremity of said shank, adapted to extend downwardly flush over the side of the lid, an arcuate cross-head carried on the lower end of said extremity and spaced from the shank a distance substantially the height of the lid, said cross-head having an inwardly reverted portion terminating in a sharp edge and conforming in shape to have full flush engagement with the under edge of the lid of a container, and a depending reverted hook-shaped sheet metal member having an opening for receiving the shank and slidable along the length of said shank and engageable under the opposite side of the edge of the lid, whereby the device will support the lid when removed from the container.

References Cited in the file of this patent

UNITED STATES PATENTS

| | | |
|---|---|---|
| 941,865 | Forsyth et al. | Nov. 30, 1909 |
| 1,211,233 | Rhonemus | Jan. 2, 1917 |
| 1,739,457 | Harrison | Dec. 10, 1929 |
| 1,820,575 | Mayhew | Aug. 25, 1931 |
| 2,440,485 | Ranseen | Apr. 27, 1948 |
| 2,589,051 | Carter | Mar. 11, 1952 |